United States Patent
Suzuki

(10) Patent No.: US 7,623,561 B2
(45) Date of Patent: Nov. 24, 2009

(54) CHANNEL CHARACTERISTICS ESTIMATION SYSTEM, CHANNEL CHARACTERISTICS ESTIMATION METHOD, COMMUNICATION APPARATUS, AND COMMUNICATION METHOD

(75) Inventor: Mitsuhiro Suzuki, Chiba (JP)

(73) Assignee: Sony Corporation, Tokyo (JP)

( * ) Notice: Subject to any disclaimer, the term of this patent is extended or adjusted under 35 U.S.C. 154(b) by 752 days.

(21) Appl. No.: 10/909,556

(22) Filed: Aug. 3, 2004

(65) Prior Publication Data

US 2005/0058092 A1    Mar. 17, 2005

(30) Foreign Application Priority Data

Aug. 19, 2003 (JP) ............... 2003-294942

(51) Int. Cl.
*H04B 1/00* (2006.01)
(52) U.S. Cl. .............. 375/132; 375/133; 375/135; 375/136; 370/320
(58) Field of Classification Search ............ 375/132, 375/133, 135, 136; 370/320
See application file for complete search history.

(56) References Cited

U.S. PATENT DOCUMENTS

| | | | | |
|---|---|---|---|---|
| 6,088,406 A | * | 7/2000 | Suzuki | 375/343 |
| 6,618,352 B1 | * | 9/2003 | Shirakata et al. | 370/203 |
| 7,024,172 B1 | * | 4/2006 | Murphy et al. | 455/324 |
| 7,158,078 B2 | * | 1/2007 | Ninomiya et al. | 342/457 |
| 7,164,733 B1 | * | 1/2007 | Griffin et al. | 375/324 |
| 2005/0090208 A1 | * | 4/2005 | Liao | 455/112 |
| 2005/0249265 A1 | * | 11/2005 | Shoji et al. | 375/133 |

FOREIGN PATENT DOCUMENTS

JP    11-154933    6/1999

OTHER PUBLICATIONS

Sari et al (hereinafter Sari), "An Analysis of Orthogonal Frequency-Division Multiple Access", SAT, Telecommunications Division, IEEE 1997.*

Hamaguchi et al (hereinafter Hamaguchi), "Time-Frequency Spread OFDM/FHMA", Communications Research Laboratory, Dept. of ECS, University of Southampton, IEEE 2003.*

* cited by examiner

*Primary Examiner*—Mohammad H Ghayour
*Assistant Examiner*—Leon Flores
(74) *Attorney, Agent, or Firm*—Oblon, Spivak, McClelland, Maier & Neustadt, L.L.P.

(57) ABSTRACT

Channel characteristics need to be estimated in a wireless communication system which performs frequency hopping. A transmission side aligns phase values of carriers of frequencies used for hopping to known values at a transmission start time and transmits a transmission signal for each hopping obtained by converting frequencies. A reception side aligns phase values of carriers of frequencies used for each hopping at a reception start time and performs frequency conversion for respective reception signals. A phase rotation component contained in the reception signal for each hopping is common to all hoppings. Consequently, the phase rotation component can be included in channel characteristics to be measured for estimation.

20 Claims, 16 Drawing Sheets

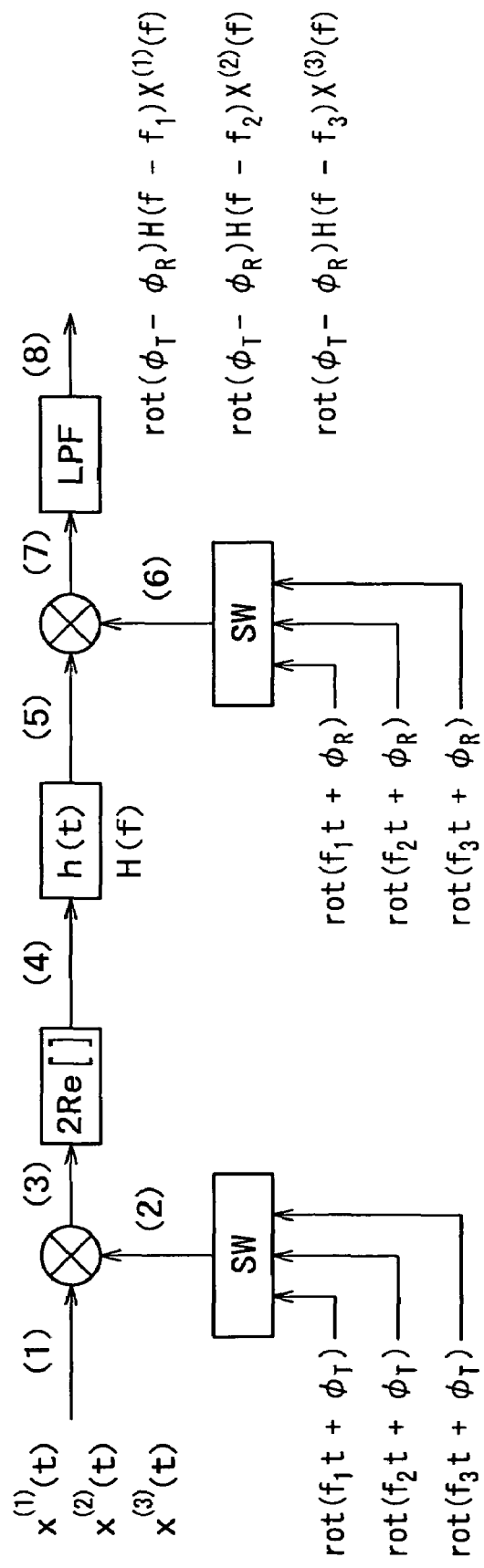

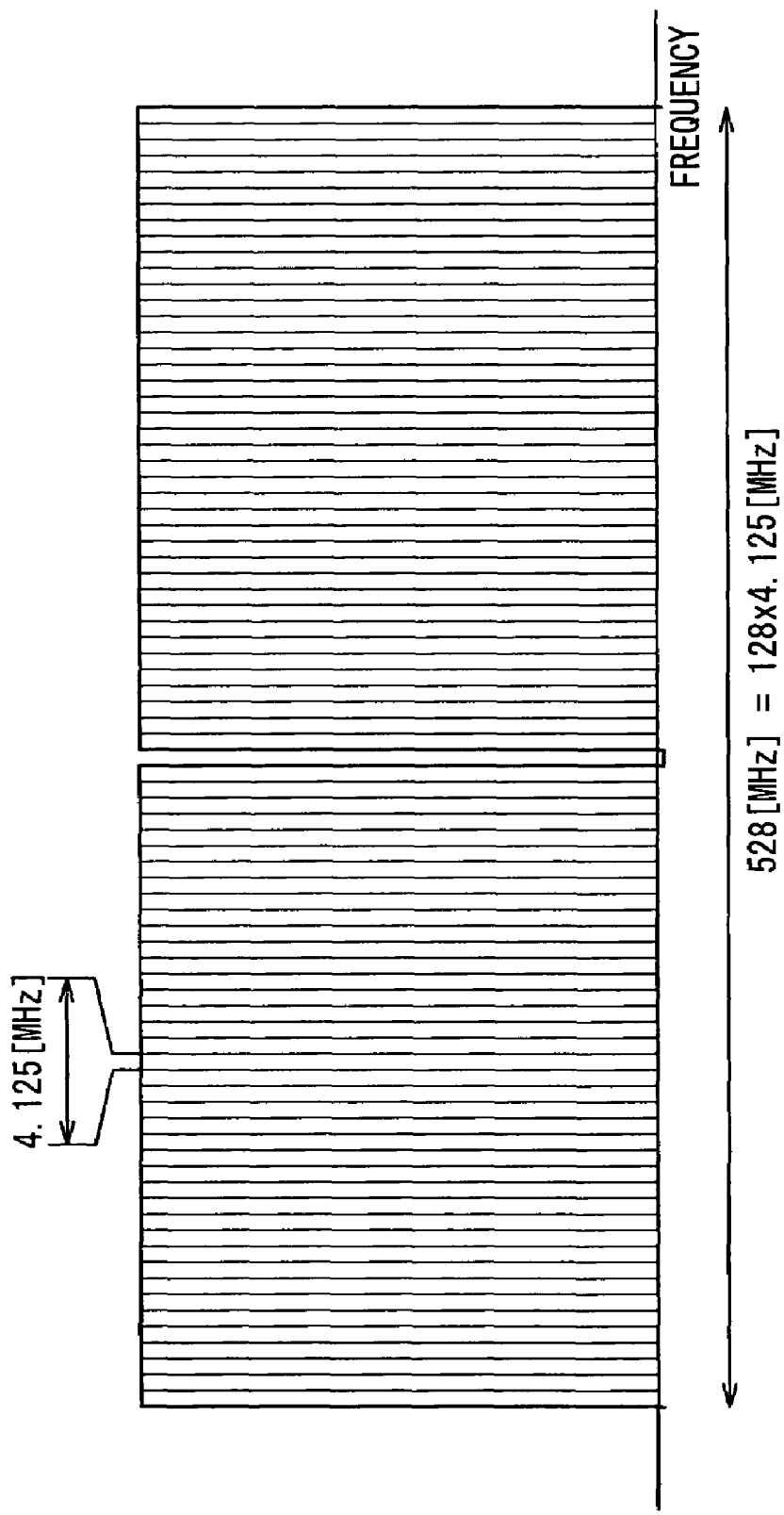

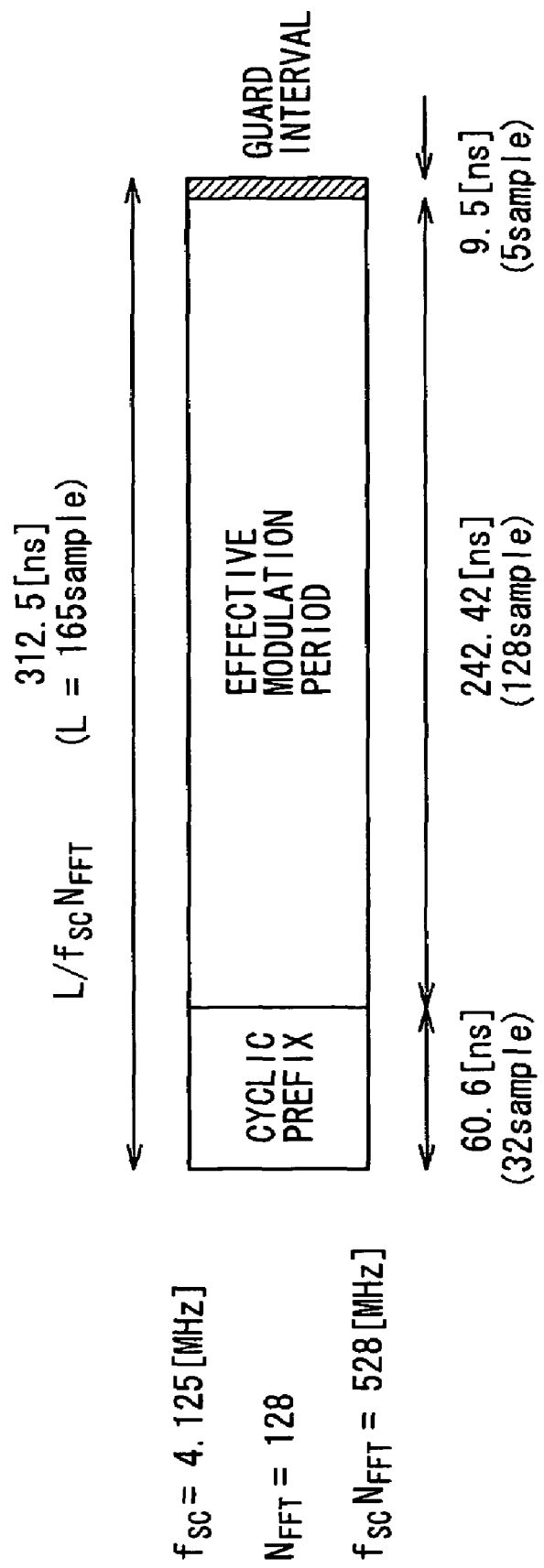

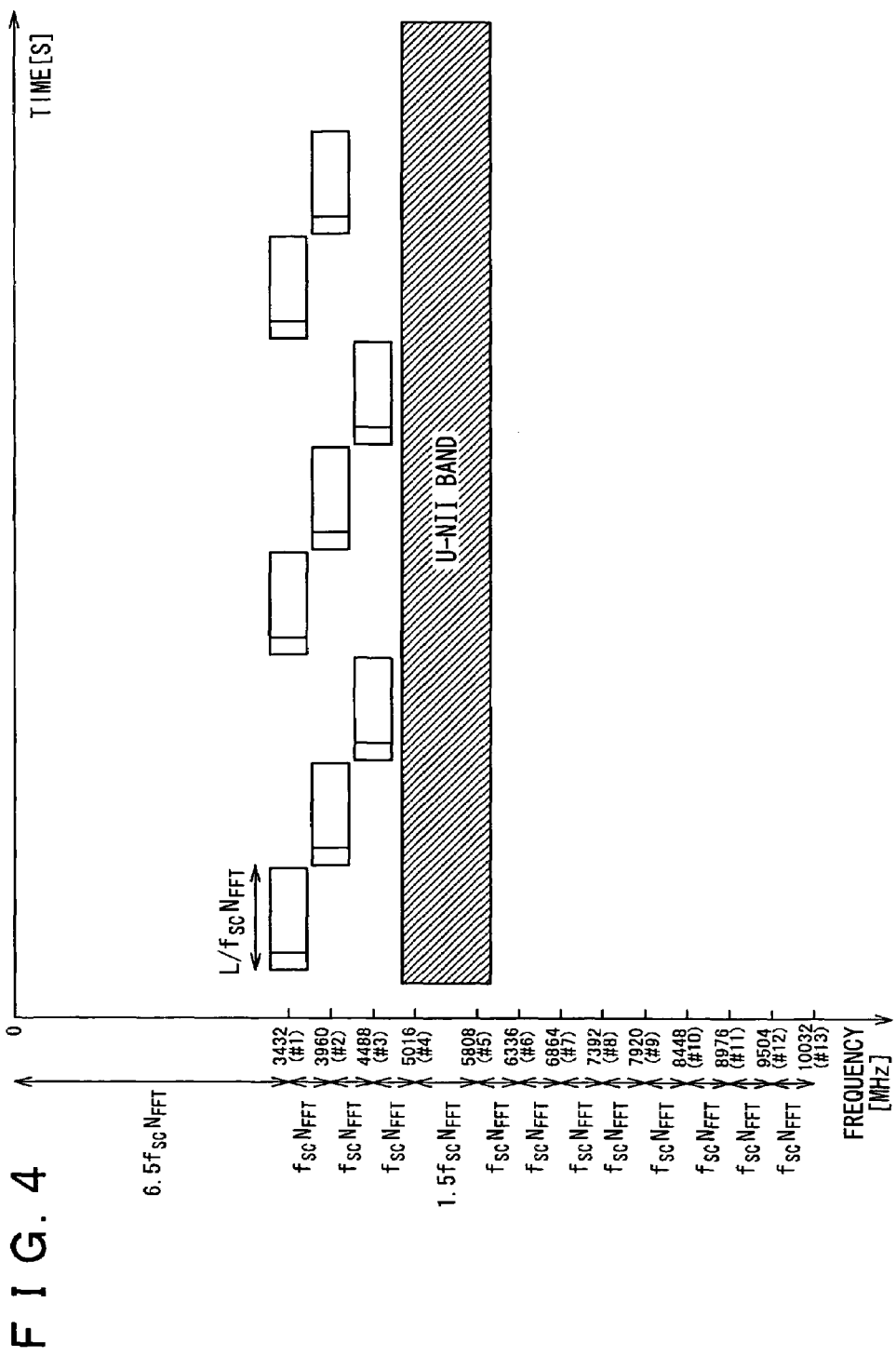

F I G. 1 4
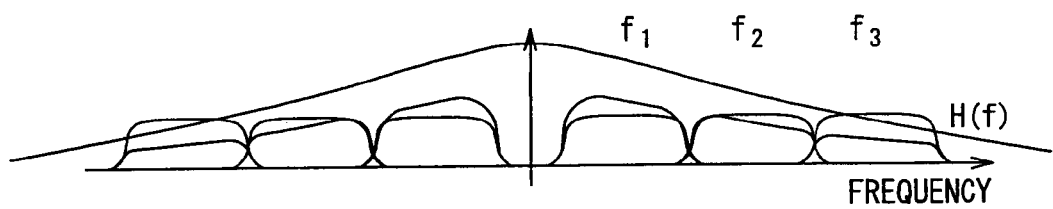
RELATED ART

RELATED ART

CHANNEL CHARACTERISTICS ESTIMATION SYSTEM, CHANNEL CHARACTERISTICS ESTIMATION METHOD, COMMUNICATION APPARATUS, AND COMMUNICATION METHOD

BACKGROUND OF THE INVENTION

1. Field of the Invention

The present invention relates to a channel characteristics estimation system, a channel characteristics estimation method, a communication apparatus, and a communication method for estimating channel characteristics under wireless communication environment and particularly to a channel characteristics estimation system, a channel characteristics estimation method, a communication apparatus, and a communication method for estimating channel characteristics in order to more accurately measure the arrival time of reception signals for the purpose of ranging.

More specifically, the present invention relates to a channel characteristics estimation system, a channel characteristics estimation method, a communication apparatus, and a communication method for estimating channel characteristics in wide bands and particularly to a channel characteristics estimation system, a channel characteristics estimation method, a communication apparatus, and a communication method for estimating channel characteristics in wider bands in a wireless communication system that performs frequency hopping.

2. Description of Related Art

Special attention is paid to wireless LAN as a system to free users from cabling of hardwired LANs. The wireless LAN can eliminate most of cables in working spaces such as offices. Accordingly, it is possible to relatively easily move communication terminals such as personal computers (PCs). In recent years, there is a remarkably increasing demand for wireless LAN systems as they achieve higher speed and become available at reduced costs. Recently, introduction of a personal area network (PAN) is especially being considered to construct a small-scale network for information communication between electronic devices available around users. For example, there are provided different wireless communication systems and wireless communication apparatuses using frequency bands such as 2.4 GHz and 5 GHz bands that need not be licensed by governing legal authorities.

In recent years, for example, attention is focused on the "ultra wide band (UWB) communication" as a wireless communication system capable of short-distance, ultrafast transmission. The system performs wireless communication by carrying information on very weak impulse sequences. It is expected to put the system into practical use. Presently in IEEE802.15.3 and the like, there are devised data transmission systems having the packet structure including preambles as access control systems for ultra wide band communication.

If a wireless network is constructed under a working environment where many devices are mixed in a room, it is possible to suppose that a plurality of networks are constructed in an overlapping fashion. A wireless network using a single channel cannot provide any countermeasure against a case where another system interrupts during communication or an interference occurs to degrade the communication quality. To solve this problem, there is proposed a multi-channel communication system that provides a plurality of frequency channels and performs frequency hopping to operate. If an interference occurs to degrade the communication quality during communication, for example, frequency hopping is used to maintain network operations, enabling coexistence with the other networks.

When a wireless network is constructed in a room, receivers form a multipath environment to receive an overlap of a direct wave and a plurality of reflected waves or delay waves. Multipath generates a delay distortion (or frequency selective fading) to cause a communication error. Further, a delay distortion causes inter symbol interference.

A major countermeasure against delay distortion can be a multi-carrier transmission system. The multi-carrier transmission system transmits data by dividing it into a plurality of carriers having different frequencies. Each carrier uses a narrow band and is hardly subject to frequency selective fading.

For example, the OFDM (Orthogonal Frequency Division Multiplexing) system, one of multi-carrier transmission systems, configures a frequency of each carrier so that the carriers become orthogonal to each other in a symbol region. During information transmission, the system converts serially transmitted information into parallel information at a symbol frequency lower than the information transmission rate. The system allocates a plurality of pieces of output data to each carrier, modulates the amplitude and the phase for each carrier, and performs the inverse FFT for the carriers. In this manner, the system converts the carriers into signals along the time-domain by maintaining the orthogonality of each carrier along the frequency-domain. The reception occurs in the reverse order of the transmission. The system performs the FFT to convert signals along the time-domain into those along the frequency-domain and demodulates the carriers in accordance with the modulation of each carrier. The system performs parallel-serial conversion to reproduce the information that was originally transmitted in the serial signals.

The OFDM modulation system is adopted as a wireless LAN standard in the IEEE802.11a/g, for example. The IEEE802.15.3 standardization is also in progress for the UWB communication system using the OFDM modulation system in addition to the DS-UWB system and the impulse-UWB system. The DS-UWB system increases spread speeds of DS information signals to the utmost limit. The impulse-UWB system uses impulse signal sequences having very short frequencies of several hundred picoseconds to configure information signals for transmission and reception. The OFDM_UWB communication system investigates an OFDM modulation that performs frequency hopping (FH) for a frequency band of 3.1 through 4.8 GHz into three sub-bands each comprising 528 MHz bandwidths and uses IFFT/FFT with frequency band comprising 128 points (e.g., see non-patent document 1).

On the other hand, the UWB communication uses ultra narrow pulses to provide high time resolution. This property can be applied to ranging for radar and positioning. In particular, the latest UWB communication can provide both high-speed data transmission over 100 Mbps and the intrinsic ranging function at the same time (e.g., see patent document 1).

In the future, it is expected that WPAN (Wireless Personal Access Network) for near field communication represented by the UWB communication is installed in all household electrical goods and CE (Consumer Electronics) devices. Therefore, in addition to the high-speed data transmission, it is considered to use position information based on the ranging, e.g., provide wireless added values such as navigation and Near Field Communication (NFC). It may be desirable to provide not only the high-speed data transmission, but also the ranging function.

For example, the UWB communication standardization in IEEE802.15.3a includes the UWB ranging technology (e.g., see non-patent document 1).

It is a general practice to start ranging from time T from transmission of a packet to reception thereof. In order to improve the ranging resolution, it is important to measure channel characteristics under multipath environment in as wide a band as possible in a short time period and to more accurately measure arrival time T of a reception signal. This is equivalent to a fine pulse width. If the measurement can be performed in units of nanoseconds, for example, the ranging is available at resolution of approximately 30 cm.

The following describes the ranging resolution in the UWB communication system that is being standardized in IEEE802.15.3a. As mentioned above, it is highly possible that the communication system will adopt a frequency hopping system sub-banded every 528 MHz. Performing the ranging for each sub-band just provides a 2-nanosecond time resolution (approximately 60 cm as a spatial resolution) equivalent to the reciprocal number of the bandwidth. The ranging accuracy becomes insufficient.

If it is possible to integrate channel characteristics estimated in each sub-band where frequency hopping is performed, wide-band channel characteristic estimation is feasible. However, the following problem arises when an orthogonal frequency modulation system such as OFDM performs the wide-band channel characteristics estimation using all bands.

FIG. 9 schematically shows the mechanism of modulation, propagation, and demodulation in the OFDM modulation system. FIG. 9 is viewed from the time region.

First, transmission baseband signal x(t) is multiplied (1) by complex sine wave rot($f_c$t) of carrier frequency $f_c$ (2) to convert the frequency (3). In this example, function rot(x) is defined to be exp($2\pi j x$).

A transmission RF signal can be obtained by taking the real part of the complex sine wave rot($f_c$t) (4). An impulse response called channel characteristics h(t) passes through the channel (5).

The reception side multiplies complex sine wave rot($-f_c$t) whose positive and negative signs are in inverse relation to the counterparts of the transmission side, i.e., takes the complex conjugate of the complex sine wave of the transmission side to convert the frequency (7). The result is allowed to pass through a low-pass filter LPF (8) to obtain a reception baseband signal (8).

FIG. 10 shows the orthogonal modulation and demodulation mechanism in FIG. 9 viewed from a frequency region;

That is to say, transmission baseband signal X(f) (1) is convoluted with complex sine wave δ (f-$f_c$) of carrier frequency $f_c$ (2) to convert the frequency (3).

The transmission RF signal is obtained by generating a complex-conjugate-symmetric component against frequency 0 (4). The channel allows frequency characteristic H(f) to pass (5).

The reception side convolutes the frequency's complex sine wave δ (f+$f_c$) whose positive and negative signs are in inverse relation to the counterparts of the transmission side (6), i.e., converts the frequency (7). The result is allowed to pass through a low-pass filter LPF to obtain reception baseband signal H(f-$f_c$)X(f) (8).

Let us assume that the transmission baseband signal X(f) is a known training signal between transmission and reception sides, for example. The reception side can divide the reception baseband signal H (f-$f_c$)X(f) by the training signal component X(f) to obtain channel characteristics H(hat) (f-$f_c$) in fc at which the signal is propagated.

$$\hat{H}(f-f_c)=H(f-f_c)X(f)/X(f)=H(f-f_c) \quad \text{[Equation 1]}$$

The orthogonal modulation and demodulation system in FIG. 9 gives no consideration to a phase difference between frequencies used for the frequency conversion. Actually, both the transmission and reception sides each use a high precision temperature compensated crystal oscillator (TCXO) of approximately 1 ppm to obtain frequencies with errors small enough for the frequency conversion. However, it is impossible to make adjustment as accurately as the phase of complex sine waves. Let us define $\phi_T$ and $\phi_R$ to be complex sine wave's phase differences in the transmission and reception sides, respectively. Then, the orthogonal modulation and demodulation system in FIG. 9 is modified as shown in FIG. 11.

When considering the complex sine wave's phase difference $\phi_T$ at the transmission side, transmission baseband signal x(t) (1) is multiplied by complex sine wave rot($f_c$t+$\phi_T$) of carrier frequency fc containing phase difference $\phi_T$ (2) to convert the frequency (3). The transmission RF signal can be obtained by taking the real part of complex sine wave rot($f_c$t+$\phi_T$) (4). An impulse response called channel characteristics h(t) passes through the channel (5).

The reception side multiplies the impulse response by complex sine wave rot($-f_c$t-$\phi_R$) (6) that has positive and negative signs in inverse relation to the counterparts of the transmission side and contains phase difference $\phi_R$ to convert the frequency (7). The result is allowed to pass through the low-pass filter LPF (8) to obtain a reception baseband signal (8). From the viewpoint of the frequency region, there is provided reception baseband signal rot($\phi_T-\phi_R$) H (f-$f_c$)X(f) containing phase rotation component rot($\phi_T-\phi_R$) based on phase differences $\phi_T$ and $\phi_R$ in the transmission and reception sides, respectively. Therefore, a channel characteristics estimation value contains this phase rotation component rot($\phi_T-\phi_R$) as shown in the following equation.

$$\hat{H}(f-f_c)=rot(\theta)H(f-f_c)X(f)/X(f)=rot(\phi_T-\phi_R)H(f-f_c) \quad \text{[Equation 2]}$$

The phase rotation component rot($\phi_T-\phi_R$) corresponds to phase rotation of the entire signal and causes no particular problem only if the single frequency channel fc is used for transmission and reception. On the contrary, this specification assumes the frequency hopping system that performs hopping between a plurality of sub-bands. Further, the system aims at integrating channel characteristics estimation values in each sub-band to provide wide-band channel characteristics estimation. This makes clear the problem of phase differences $\phi_T$ and $\phi_R$ contained in the transmission and reception sides. This topic will be described in more detail.

As shown in FIG. 12, the frequency hopping system can provide wide-band transmission by sequentially changing frequencies f1, f2, and f3 to be transmitted for each time slot.

FIG. 13 illustrates a mechanism to perform the orthogonal modulation and demodulation for each frequency channel in the frequency hopping system in FIG. 12. In this example, it is assumed that phase differences $\phi_{T1}$, $\phi_{T2}$, and $\phi_{T3}$ are contained corresponding to the transmission frequencies f, $f_2$, and $f_3$ in a complex sine wave used for the frequency conversion at the transmission side. It is also assumed that phase differences $\phi_{R1}$, $\phi_{R2}$, and $\phi_{R3}$ are contained in a complex sine wave used for the frequency conversion at the reception side.

Transmission baseband signals $x^{(1)}$ (t), $x^{(2)}$ (t), and $x^{(3)}$ (t) (1) corresponding to the transmission frequencies are multiplied by complex sine waves rot($f_1$t+$\phi_{T1}$), rot($f_2$t+$\phi_{T2}$), and rot($f_3$t+$\phi_{T3}$) corresponding to the carrier frequencies containing the phase differences $\phi_{T1}$, $\phi_{T2}$, and $\phi_{T3}$ (2) to convert the frequencies (3). The transmission RF signal can be obtained by taking the real part of each complex sine wave (4). An impulse response called channel characteristics h (t) passes through the channel (5).

The reception side multiplies complex sine waves rot($-f_1$t-$\phi_{R1}$), rot($-f_2$t-$\phi_{R2}$), and rot($-f_3$t-$\phi_{R3}$) that have positive and negative signs in inverse relation to the counterparts of the transmission side and contain phase differences $\phi_{R1}$, $\phi_{R2}$, $\phi_{R3}$ corresponding to the transmission frequencies to convert the frequencies (7). The result is allowed to pass through the low-pass filter LPF (8) to obtain a reception baseband signal (8).

From the viewpoint of the frequency region, there are provided reception baseband signals $rot(\phi_{T1}-\phi_{R1}) H (f-f_1) X^{(1)} (f)$, $rot(\phi_{T2}-\phi_{R2}) H (f-f_2) X^{(2)} (f)$, and $rot(\phi_{T3}-\phi_{R3}) H (f-f_3) X^{(3)} (f)$ containing phase rotation components based on the phase differences in the transmission and reception sides corresponding to the transmission frequencies. Consequently, channel characteristics estimation values are obtained for the corresponding transmission frequencies and inevitably contain different phase rotation components rot $(\phi_{T1}-\phi_{R1})$, $rot(\phi_{T2}-\phi_{R2})$, and $rot(\phi_{T3}-\phi_{R3})$ as shown in the following equation.

$$\hat{H}(f-f_1)=rot(\phi_{T1}-\phi_{R1})H(f-f_1)$$

$$\hat{H}(f-f_2)=rot(\phi_{Ts}-\phi_{R2})H(f-f_2)$$

$$\hat{H}(f-f_3)=rot(\phi_{T3}-\phi_{Rs})H(f-f_3) \quad \text{[Equation 3]}$$

That is to say, it is possible to measure frequency characteristics in each band (see FIG. 14). However, the channel characteristics estimation values obtained for the transmission frequencies are not continuous as complex numbers (discontinuous phases). It is impossible to join these values so as to be assumed to be continuous frequency characteristics. FIG. 15 shows amplitudes and phase arg (H (hat) (f)) of channel characteristics estimation value | H(hat) (f) | in each frequency hopping. As can be seen from FIG. 15, the amplitudes are continuous in the frequency hoppings. However, the phases are discontinuous because they deviate from desired values due to phase differences contained in the frequencies. In other words, it is impossible to integrate channel characteristics estimation values in the sub-bands for hopping so as to generate a wide-band channel characteristics estimation value.

When ranging is performed in the communication systems such as UWB, using a higher time resolution to detect time responses on the channel is equivalent to using a higher distance resolution to measure a distance. When the transmission estimation is required in the frequency region, it is necessary to find continuous frequency characteristics in wider bands.

[Patent document 1] Japanese Translation of Unexamined PCT Appln. 2002-517001

[Non-patent document 1] IEEE802.15.3a TI Document <URL: http://grouper.ieee.org/groups/802/15/pub/2003/May03 filename: 03142r2P802-15_TI-CFP-Document.doc>

SUMMARY OF THE INVENTION

It is an object of the present invention to provide a channel characteristics estimation system, a channel characteristics estimation method, a communication apparatus, and a communication method capable of excellently estimating channel characteristics in order to more accurately measure the arrival time of reception signals for the purpose of ranging.

It is another object of the present invention to provide a channel characteristics estimation system, a channel characteristics estimation method, a communication apparatus, and a communication method for estimating channel characteristics in wider bands in a wireless communication system that performs frequency hopping.

The present invention has been made in consideration of the foregoing and provides a channel characteristics estimation system to estimate channel characteristics in a wireless communication system which performs frequency hopping, wherein a transmission side aligns phase values of carriers of frequencies used for frequency hopping to known values at a specified time reference point and transmits a transmission signal for each hopping obtained by converting frequencies; and wherein a reception side aligns phase values of carriers of respective frequencies used for frequency hopping to known values at a specified time reference point so as to maintain a given relation with phase values for the transmission side and performs frequency conversion for reception signals of respective frequencies using respective frequencies to obtain a reception signal for each hopping.

When ranging is performed in the communication systems such as UWB, using a higher time resolution to detect time responses on the channel is equivalent to using a higher distance resolution to measure a distance. When the transmission estimation is required in the frequency region, it is necessary to find continuous frequency characteristics in wider bands.

When the frequency hopping system is adopted, however, performing the ranging for each sub-band merely provides the time resolution equivalent to the reciprocal number of each bandwidth. The ranging accuracy becomes insufficient.

If it is possible to integrate channel characteristics estimated in each sub-band where frequency hopping is performed, wide-band channel characteristic estimation is feasible. It is possible to measure frequency characteristics in each band. Since the phases is discontinuous, however, it is impossible to join the frequency characteristics so as to be assumed to be continuous. That is to say, it is impossible to integrate channel characteristics estimation values in the sub-bands for hopping so as to generate a wide-band channel characteristics estimation value.

According to the present invention, on the other hand, the transmission side aligns phase values of carriers of frequencies used for hopping to known values at a transmission start time and transmits a transmission signal for each hopping obtained by converting frequencies. The reception side aligns phase values of carriers of frequencies used for each hopping at a reception start time and performs frequency conversion for respective reception signals.

Therefore, a phase rotation component contained in the reception signal for each hopping is common to all hoppings. Consequently, the phase rotation component can be included in channel characteristics to be measured for estimation. Frequency characteristics obtained for each hopping can be assumed to be continuous. It is possible to integrate channel characteristics estimation values in each sub-band for hopping into a wide-band channel characteristics estimation value.

The transmission side may use a transmission start time as a time reference point and align phase values of carriers of respective frequencies used for frequency hopping to 0 at the time reference point. Likewise, the reception side may use a reception start time as a time reference point and align phase values of carriers of respective frequencies used for frequency hopping to 0 at the time reference point.

The transmission side and/or the reception side may divide frequencies output from a single oscillator and generate respective center frequencies by adding and subtracting frequencies to synthesize them.

In such case, the single oscillation source is used to generate all frequencies through the dividing, the frequency addition and subtraction. Accordingly, the respective frequencies are synchronous with each other.

At this time, the transmission side and/or the reception side may use a time reference point corresponding to a dividing point for the lowest frequency.

A dividing point for the lowest frequency band can be used to align all signal phases of higher-frequency signals and synthesis thereof to 0. Therefore, since the dividing point for the lowest frequency is assumed to be the time reference point, carrier phase values can be aligned to 0, making the system easily available as an apparatus.

The present invention can provide a channel characteristics estimation system, a channel characteristics estimation method, a communication apparatus, and a communication method capable of excellently estimating channel characteristics in order to more accurately measure the arrival time of reception signals for the purpose of ranging.

Further, the present invention can provide a channel characteristics estimation system, a channel characteristics estimation method, a communication apparatus, and a communication method for estimating channel characteristics in wider bands in a wireless communication system that performs frequency hopping.

These and other objects and novel features of the present invention may be readily ascertained by referring to the following more detailed description based on an embodiment of the present invention and appended drawings.

BRIEF DESCRIPTION OF THE DRAWINGS

FIG. 1 shows a mechanism to perform orthogonal modulation and demodulation for each frequency channel in a frequency hopping system according to the present invention;

FIG. 2 schematically shows an OFDM signal format in a multiband OFDM communication system;

FIG. 3 schematically shows the configuration of the OFDM signal format;

FIG. 4 shows a 3-band mode hopping pattern in the multiband OFDM system;

FIG. 14 shows measurement of frequency characteristics for each band in the frequency hopping system of FIG. 13;

DETAILED DESCRIPTION OF THE PREFERRED EMBODIMENTS

An embodiment of the present invention will be described in further detail with reference to the accompanying drawings.

Figure 12:
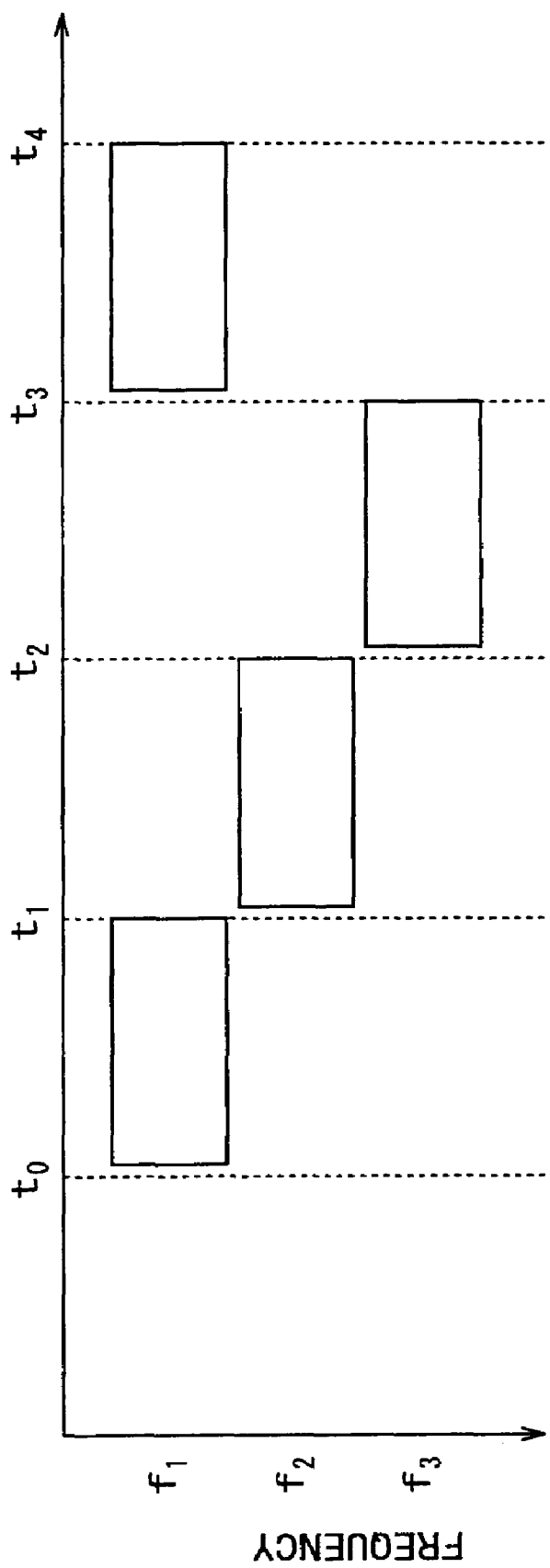
FIG. 12 shows how transmission frequencies are changed for each time slot in the frequency hopping system.
Figure 13:
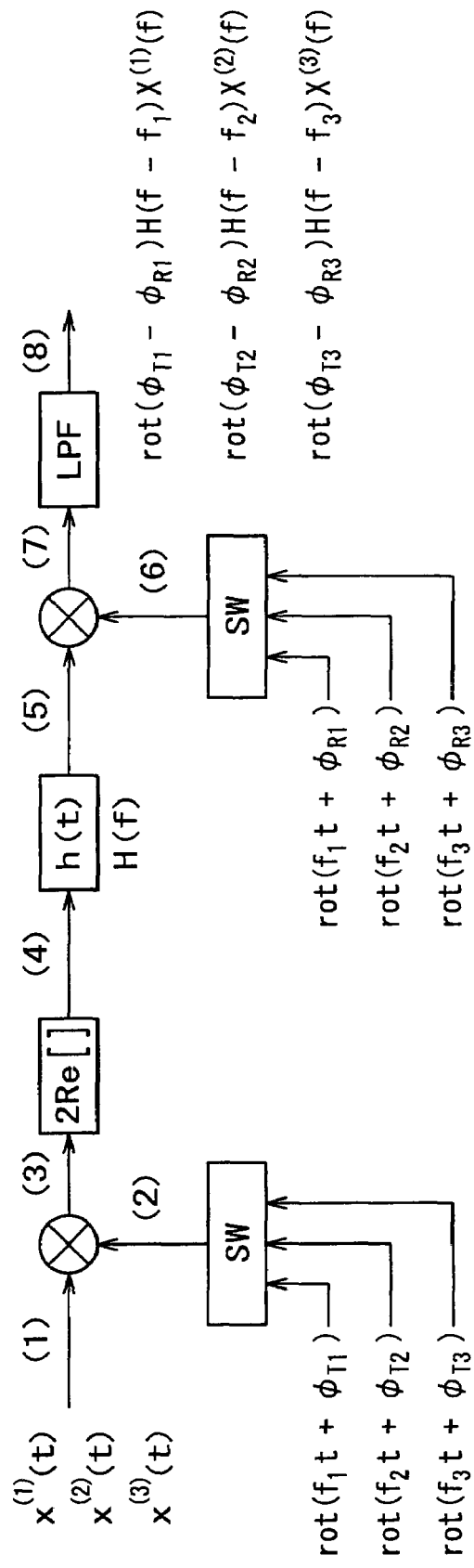
FIG. 13 illustrates a mechanism to perform the orthogonal modulation and demodulation for each frequency channel in the frequency hopping system of FIG. 12.

The following assumes the frequency hopping system as shown in FIG. 12. That is to say, the system can provide wide-band transmission by sequentially changing frequencies f1, f2, and f3 to be transmitted for each time slot.

When ranging is performed in the communication systems such as UWB, using a higher time resolution to detect time responses on the channel is equivalent to using a higher distance resolution to measure a distance. When the transmission estimation is required in the frequency region, it is necessary to find continuous frequency characteristics in wider bands.

For this purpose, as shown in the following equation, the transmission side is assumed to align phases in carrier frequencies to be used for the hopping at time $t_0=0$ to start transmission, for example.

$$c_{T1}(t) = rot(f_1 t)$$

$$c_{T2}(t) = rot(f_2 t)$$

$$c_{T3}(t) = rot(f_3 t) \quad \text{[Equation 4]}$$

The reception side is assumed to align phases in carriers to be used for the hopping at time $t_0'$ to start reception.

$$c_{R1}(t') = rot(f_1 t')$$

$$c_{R2}(t') = rot(f_2 t')$$

$$c_{R3}(t') = rot(f_3 t') \quad \text{[Equation 5]}$$

FIG. 1 shows a mechanism to perform orthogonal modulation and demodulation for each frequency channel in a frequency hopping system according to the present invention. The transmission side sets the same transmission start time $t_0$ for the transmission frequencies $f_1$, $f_2$, and $f_3$. Consequently, uniform phase difference $\phi_T$ is contained in each of the complex sine waves used for the frequency conversion. The reception side also sets the same reception start time $t_0'$. Consequently, uniform phase difference $\phi_R$ is contained in each of the complex sine waves used for the frequency conversion.

Transmission baseband signals $x^{(1)}(t)$, $x^{(2)}(t)$, and $x^{(3)}(t)$ (1) for the transmission frequencies are multiplied by complex sine waves $rot(f_1 t + \phi_T)$, $rot(f_2 t + \phi_T)$, and $rot(f_3 t + \phi_T)$ each containing phase difference $\phi_T$ for the carrier frequencies (2) to convert the frequency (3). The transmission RF signal can be obtained by taking the real part of each complex sine wave (4). An impulse response called channel characteristics h(t) passes through the channel (5).

The reception side multiplies complex sine waves $rot(f_1 t + \phi_R)$, $rot(f_2 t + \phi_R)$, $rot(f_3 t + \phi_R)$ that have positive and negative signs in inverse relation to the counterparts of the transmission side and each contain phase difference $\phi_R$ corresponding to the transmission frequencies to convert the frequencies (7). The result is allowed to pass through the low-pass filter LPF (8) to obtain a reception baseband signal (8).

From the viewpoint of the frequency region, there are provided reception baseband signals $rot(\phi_T - \phi_R) H(f-f_1)^{X(1)}(f)$, $rot(\phi_T - \phi_R) H(f-f_2)^{X(2)}(f)$, and $rot(\phi_T - \phi_R) H(f-f_3)^{X(3)}(f)$ containing phase rotation components based on the same phase difference in the transmission and reception sides corresponding to the transmission frequencies. Consequently, channel characteristics estimation values are obtained for the corresponding transmission frequencies and contain the constant phase rotation component $rot(\phi_T-\phi_R)$.

It is impossible to accurately adjust the transmission start time $t_0$ and the reception start time $t_0'$ between the transmitter and the receiver. However, the time difference is common to all the hoppings. As can be seen from FIG. 1, the channel characteristic to be measured can include the phase rotation component contained in the reception baseband signal in each band. That is to say, impulse response h' (t) on the channel can be expressed as follows.

$$h'(t)=h(t+t_0-t'_0) \quad \text{[Equation 6]}$$

Accordingly, it is possible to express channel characteristics in the bands as shown in equation (3) above as a form containing no phase difference as formulated in the following equation.

$$\hat{H}(f-f_1)=H'(f-f_1)$$
$$\hat{H}(f-f_2)=H'(f-f_2)$$
$$\hat{H}(f-f_3)=H'(f-f_3) \quad \text{[Equation 7]}$$

The above-mentioned expression form can provide continuous frequency characteristics in each band. That is to say, it is possible to integrate channel characteristics estimation values in the sub-bands for hopping to generate a wide-band channel characteristics estimation value.

The following describes application of the above-mentioned channel characteristics estimation method to the multiband UWB communication system whose standardization is under discussion in IEEE802.15.3.

The multiband UWB system uses the OFDM signal format. Signals are generated by using a sub-carrier interval $f_{sc}$ set to 4.124 [MHz], a bandwidth set to 128 $f_{sc}$=528 [MHz], and an IFFT having the number of FFT points $N_{FFT}$ set to 128 (see FIG. 2).

One OFDM signal is equivalent to 312.5 nanoseconds including a cyclic prefix and a guard interval. Generally, the OFDM transmission system inserts a guard interval between symbols so as to eliminate inter-symbol interference.

Figure 5:
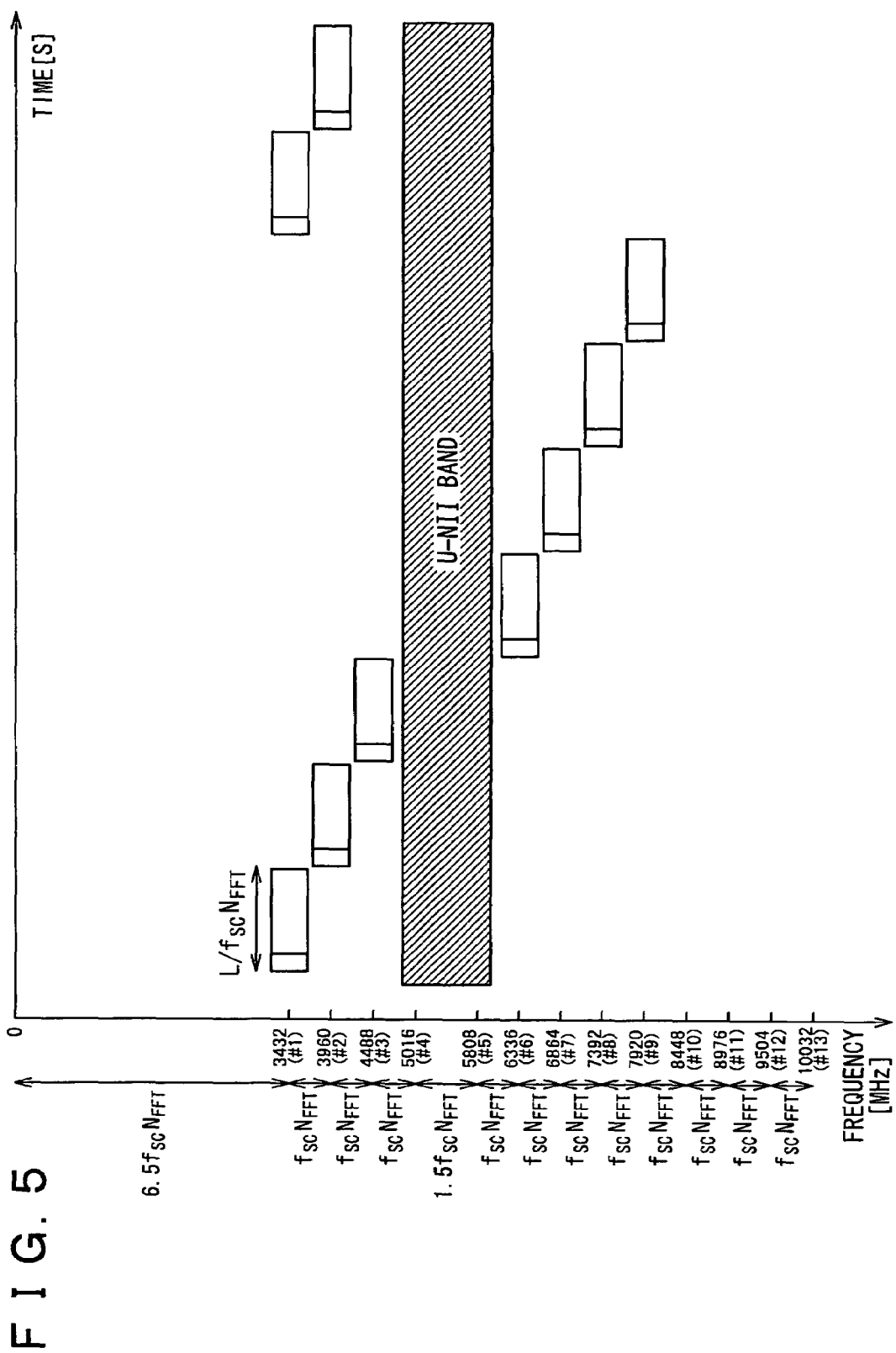
FIG. 5 shows a 7-band mode hopping pattern in the multiband OFDM system.

FIGS. 4 and 5 show hopping patterns in the multiband OFDM system. As seen from examples in the drawings, there are defined modes that use three or seven frequencies from the bottom of center frequencies disposed to prevent interference with W-LANs near 5 GHz. The following description is limited to the 3-band mode for simplicity.

Figure 6:
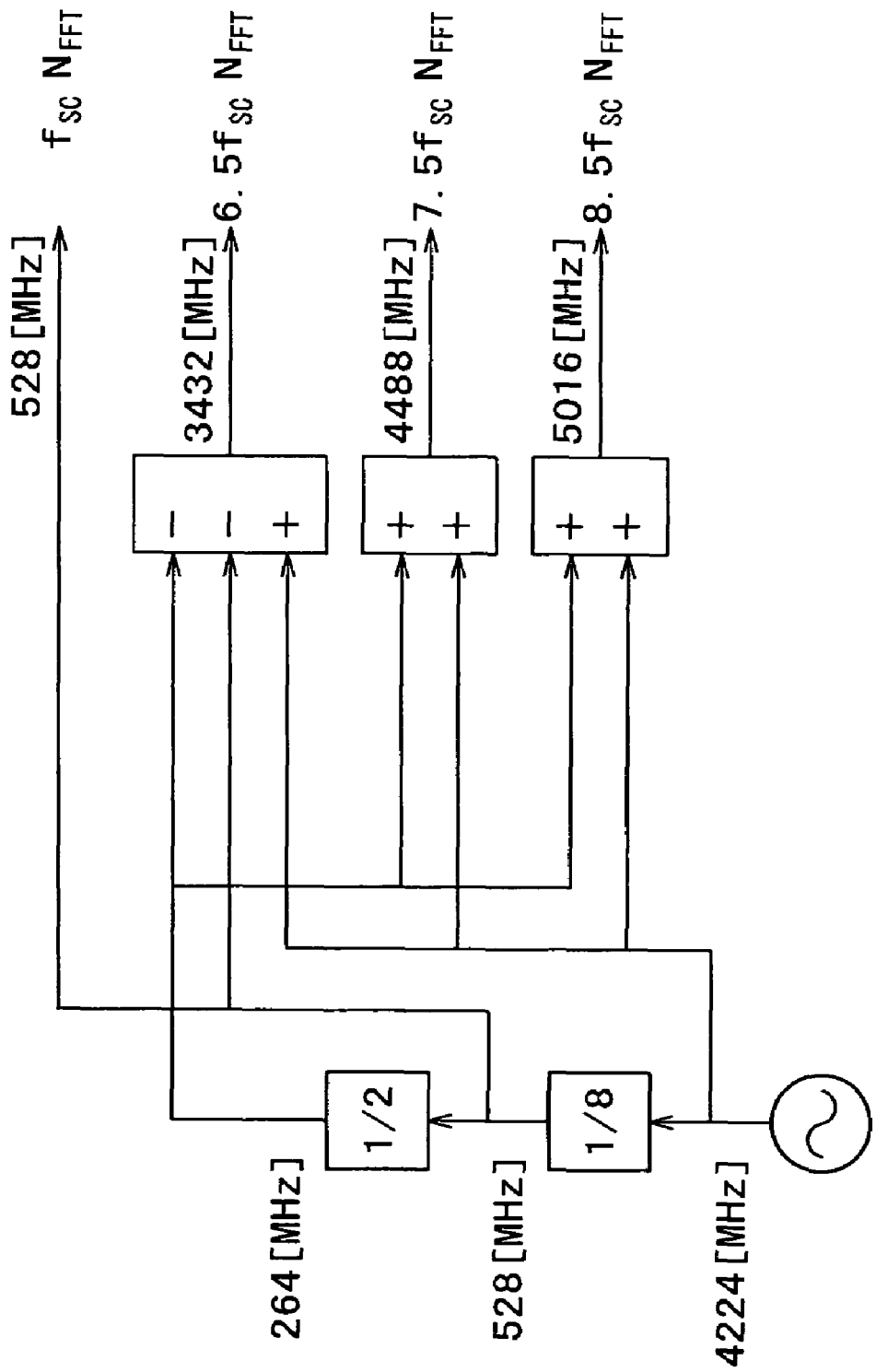
FIG. 6 shows a frequency synthesis block for hopping used in the multiband OFDM system.

FIG. 6 illustrates a frequency synthesis block (in 3-band mode) for hopping used in the multiband OFDM system. As shown in FIG. 6, a signal's center frequency can be synthesized by adding and subtracting frequencies through the use of dividing and a mixer from a single oscillator (e.g., TCXO). Further, the center frequency can be synthesized by means of 528 MHz dividing needed as a sample clock.

The example if FIG. 6 uses ⅛ dividing to extract a 528 MHz frequency from a 4224 MHz frequency output from the oscillator and then uses ½ dividing to extract a 264 MHz frequency.

Each mixer can generate a 5016 MHz frequency by adding 4224 MHz, 528 MHz, and 264 MHz frequencies, generate a 4488 MHz frequency by adding 4224 MHz and 264 MHz frequencies, and generate a 3432 MHz frequency by subtracting 528 MHz and 264 MHz frequencies from 4224 MHz.

Figure 7:
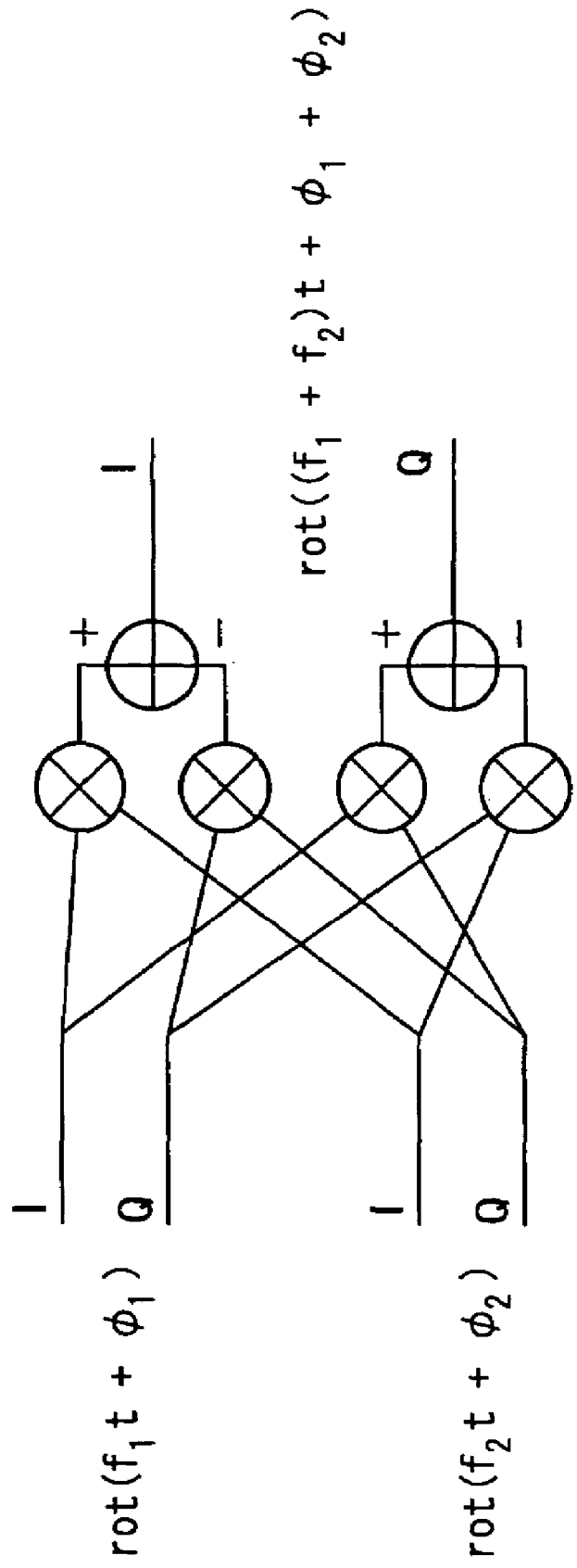
FIG. 7 shows the configuration of a frequency adder.

The mixer, i.e., a frequency addition and subtraction section, provides each signal with components orthogonal to each other and can synthesize signals by adding and subtracting frequencies based on the addition theorem of the trigonometric function as shown in the following equation. FIG. 7 shows the configuration of a frequency adder.

$$rot(f_1t+\phi_1)rot(f_2t+\phi_2)=rot((f_1+f_2)t+\phi_1+\phi_2)=\{\cos(2\pi f_1+\phi_1)\cos(2\pi f_2+\phi_2)-\sin(2\pi f_1+\phi_1)\sin(2\pi f_2+\phi_2)\}+j\{\cos(2\pi f_1+\phi_1)\sin(2\pi f_2+\phi_2)+\sin(2\pi f_1+\phi_1)\cos(2\pi f_2+\phi_2)\} \quad \text{[Equation 8]}$$

This method can generate all frequencies through the dividing, the frequency addition and subtraction from the single oscillation source. Accordingly, the respective frequencies are synchronous with each other and are expressed in the following equation.

$$c(t)=rot(Cf_{SC}t+\phi_C) \quad \text{[Equation 9]}$$

In the above-mentioned equation, C is a parameter indicating a frequency. When the frequency is 3244 MHz, C is calculated as $6.5N_{FFT}=832$. In the same equation, $\phi_C$ is a phase of each frequency when time 5 is set to 0.

The following describes how to align phases of respective carriers used for the frequency hopping.

Figure 8:
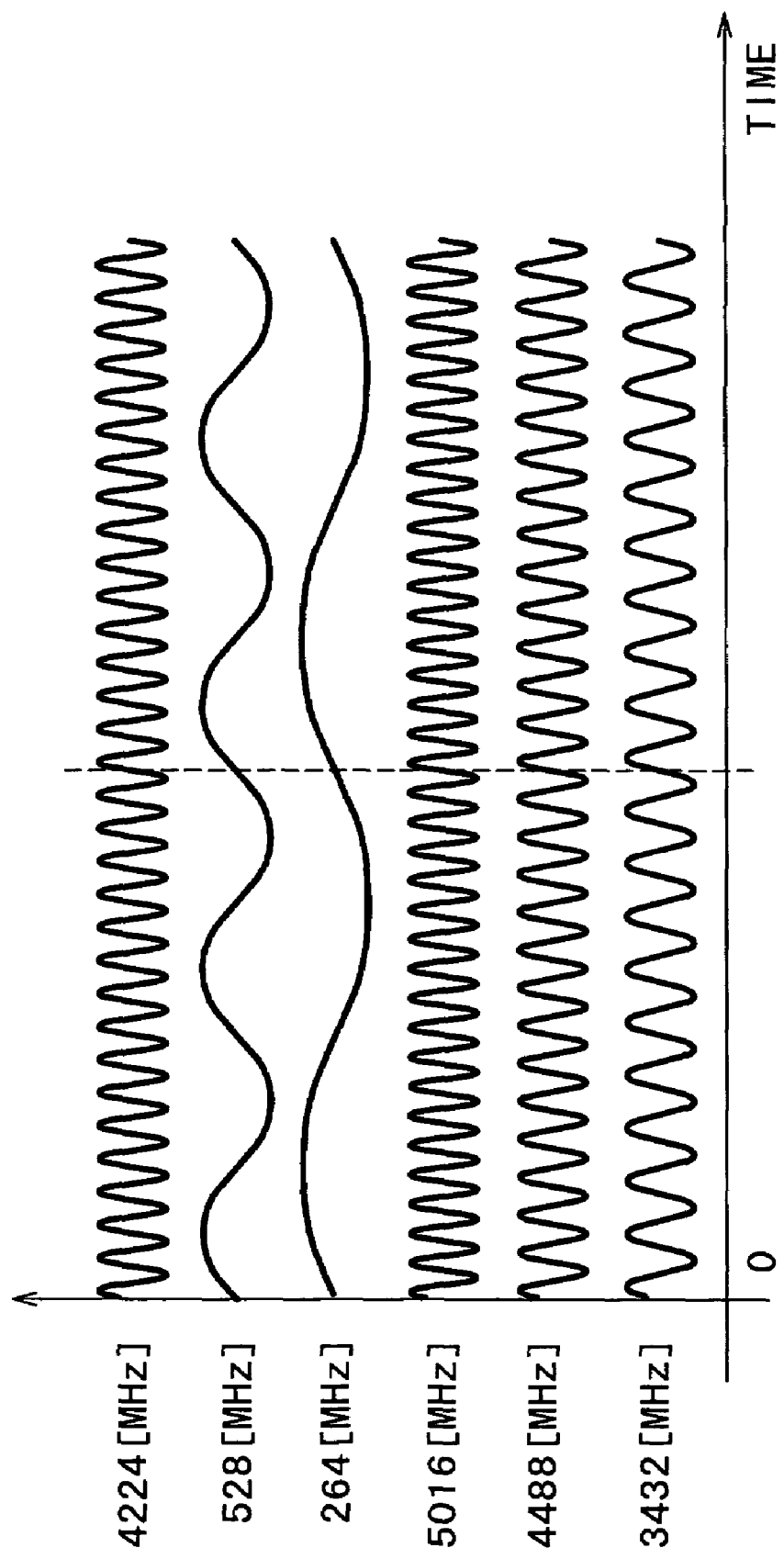
FIG. 8 shows phase relationship between frequencies obtained from the frequency synthesis block in FIG. 6.
Figure 9:
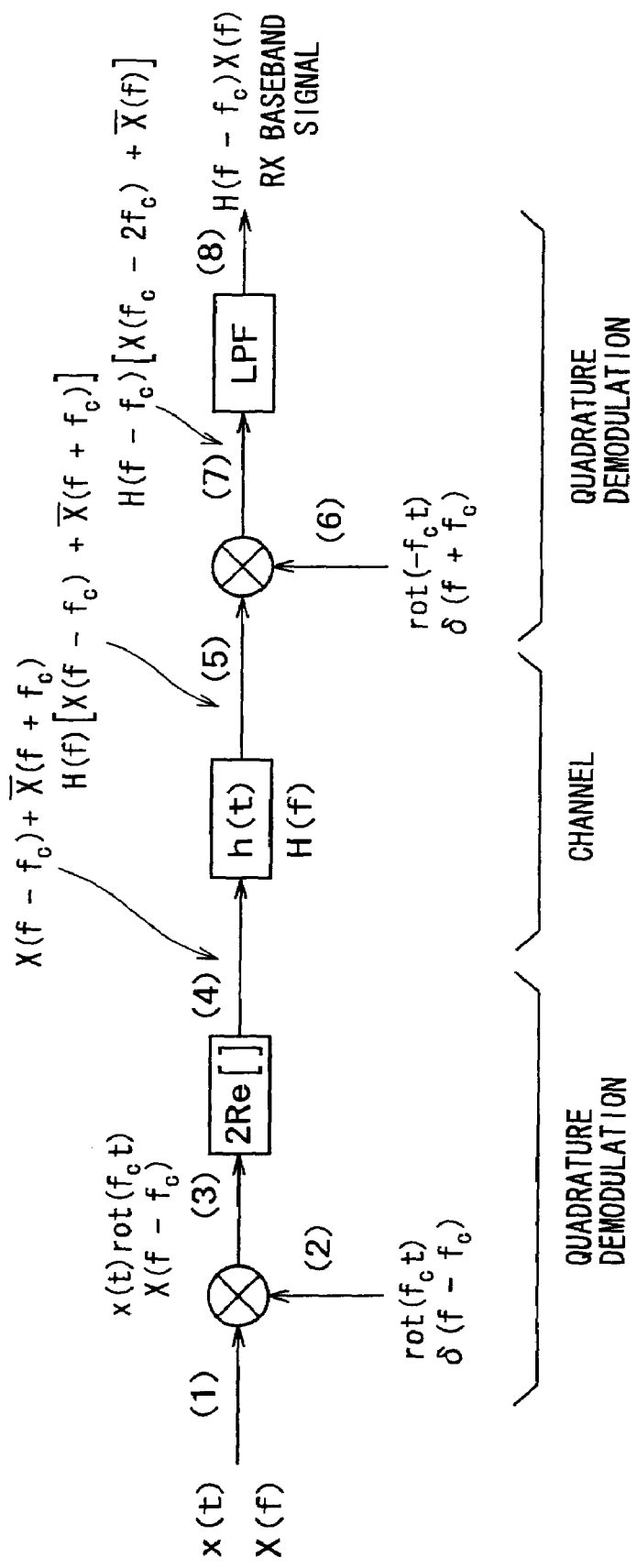
FIG. 9 schematically shows a mechanism (conventional example) of modulation, propagation, and demodulation in the OFDM modulation system.
Figure 10:
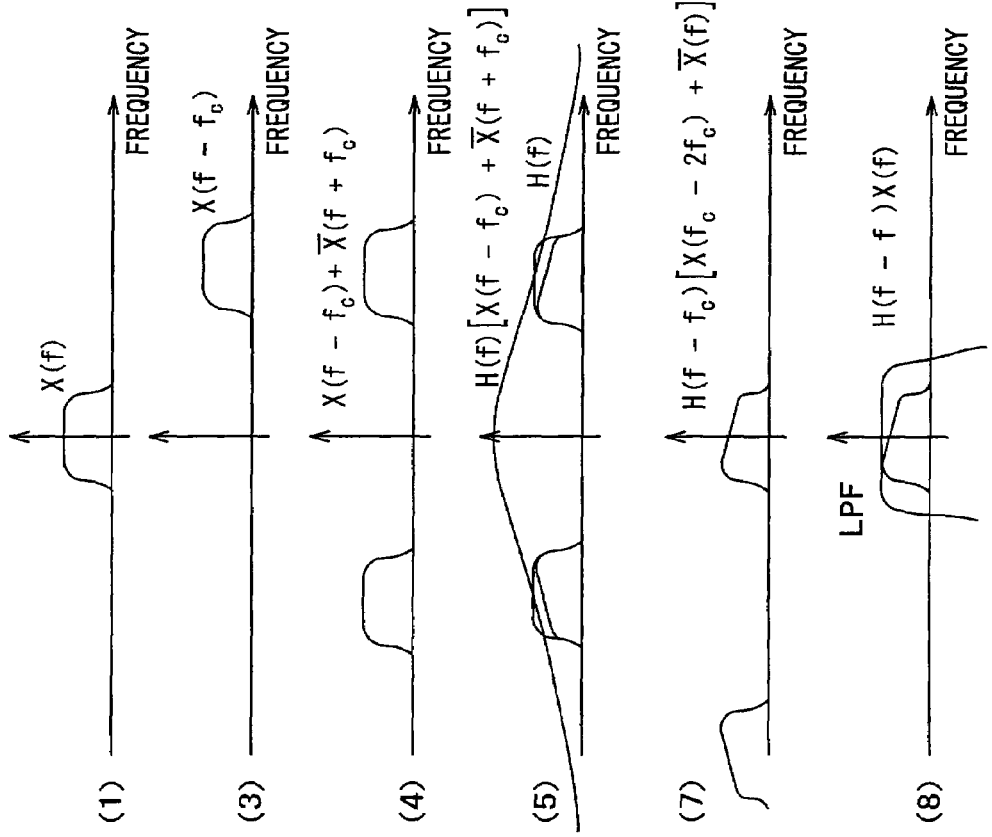
FIG. 10 shows the orthogonal modulation and demodulation mechanism in FIG. 9 viewed from a frequency region.
Figure 11:
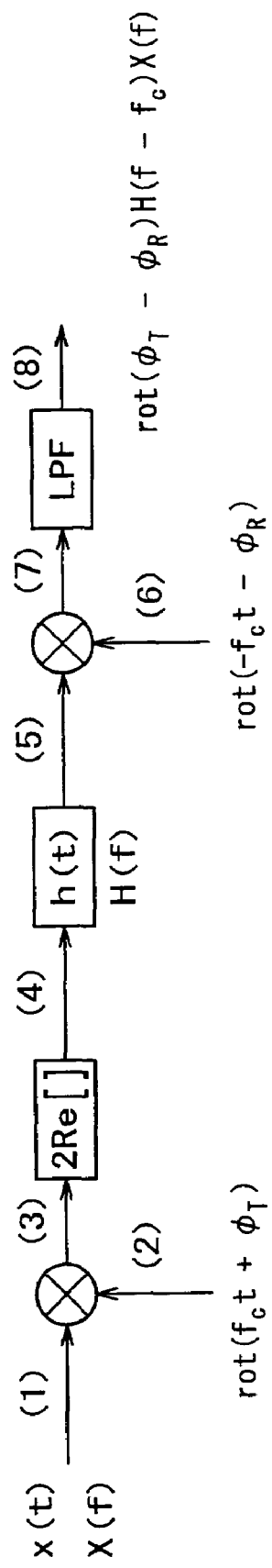
FIG. 11 shows the orthogonal modulation and demodulation mechanism in FIG. 9 in consideration of phase differences in frequencies used for frequency conversion at transmission and reception sides.

FIG. 8 shows phase relationship between frequencies obtained from the frequency synthesis block in FIG. 6.

When the phase zero point is used as a reference for higher frequency bands, lower frequency bands cause different phases. By contrast, a dividing point for the lowest frequency band of 246 MHz can be used to align all phases of 4424 MHz and 528 MHz signals and synthesis thereof to 0. Therefore, since the 264 MHz dividing point is assumed to be t=0 for the system, this can be considered to be $\phi_c 0$, making the system easily available as an apparatus. As can be seen from FIG. 8, the phases are automatically aligned every 1/264 MHz.

The transmission side defines the 264 MHz dividing point to be the transmission start. In consideration for actual reception signals, the receiver uses any of 264 MHz dividing points as the reception start time for reception.

When the channel estimation section obtains each frequency's responses, these can be assumed to be continuous frequency characteristics. It is possible to integrate channel characteristics estimation values in each sub-band for hopping into a wide-band channel characteristics estimation value.

Since channel characteristics are estimated in a wide band, the reception side can more accurately measure arrival time $\tau$ of a reception signal and improve the ranging resolution.

Figure 15:
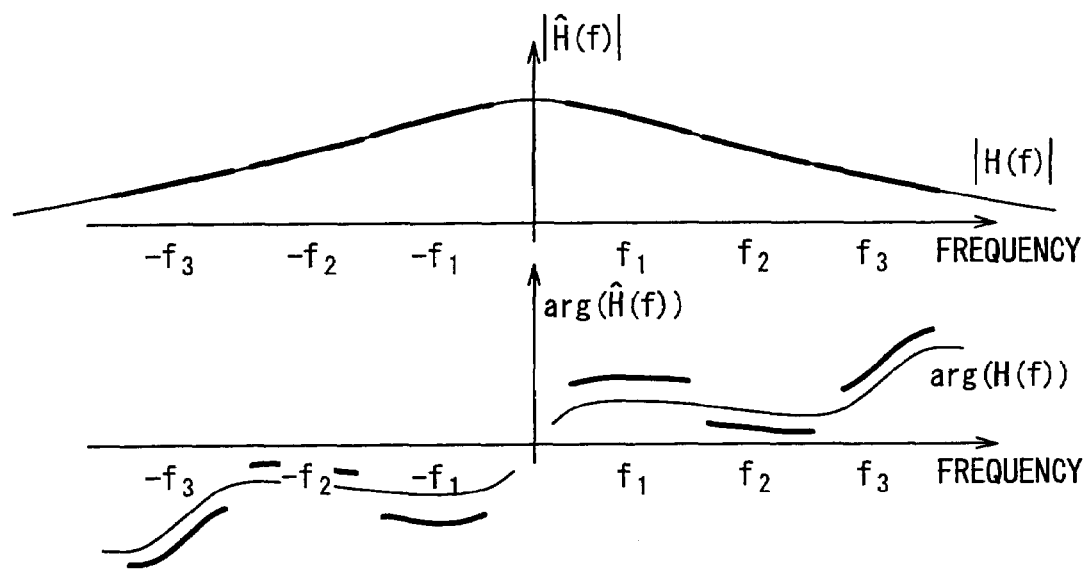
FIG. 15 shows amplitudes and phase arg (H(hat)(f)) of channel characteristics estimation value | H(hat) (f) | in each frequency hopping (conventional example)
Figure 16:
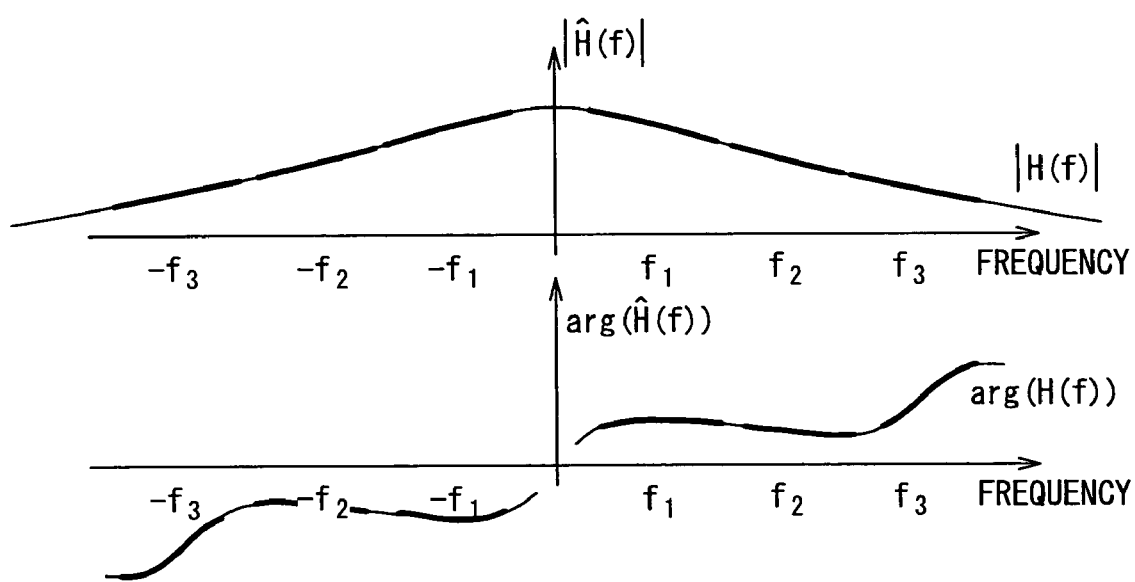
FIG. 16 shows amplitudes and phase arg (H(hat)(f)) of channel characteristics estimation value | H(hat) (f) | in each frequency hopping (present invention).

The prior art causes inconsistent phase differences in each frequency at the transmission and reception sides. Because of this, though there are continuous amplitudes for channel characteristics estimation values | H(hat) (f) | in each frequency hopping, the phases arg (H(hat) (f)) deviate from desired values and become discontinuous (see FIG. 15). By contrast, the present invention maintains consistent phase differences in each frequency at the transmission and reception sides. The desired values can be almost applied to not only the amplitudes for channel characteristics estimation values | H(hat) (f) | in each frequency hopping, but also the phases arg (H(hat) (f)), thus maintaining the continuity (see FIG. 16). Therefore, as mentioned above, frequency responses obtained in the channel estimation section for each frequency can be assumed to be continuous frequency characteristics. It is possible to integrate channel characteristics estimation values in each sub-band for hopping into a wide-band channel characteristics estimation value.

For example, the specification JP-B No. 52774/2003 already assigned to the applicant describes the ranging and positioning system that performs the ranging between the transmitter and the receiver based on time X from the packet transmission to the reception. More specifically, the ranging is performed as follows. The radio 1 transmits a packet to the radio 2 as a communication destination. The radio 2 detects the packet and then always transmits a packet after the lapse of time equivalent to integral multiples of a unit time from the packet detection. The radio 1 uses a counter to measure the time after it transmits the packet until it detects the packet from the radio 2. The radio 1 subtracts the time from the detection to the transmission of the packet in the radio 2 and the processing time of the radio 1 itself from the measured time. The result is converted into the propagation distance between the radios 1 and 2 as the communication destination.

Such ranging and positioning system can more accurately measure the propagation time using the channel characteristics estimation according to the present invention, improving the ranging resolution.

[Supplement]

There has been described in detail the present invention with reference to the specific embodiment. It is to be distinctly understood by those skilled in the art that various changes and modifications and substitutions may be made in the embodiment without departing from the spirit and scope of the present invention.

The specification has described the embodiment of accurately measuring the channel in order to improve the ranging resolution in the OFDM_UWB communication system that performs frequency hopping. Of course, the present invention can be used for the other purposes than improving the ranging resolution. Further, the present invention can be also applied to frequency hopping, and orthogonal modulation and demodulation communication systems other than OFDM_UWB.

In short, the present invention has been disclosed as an example. The contents of this specification should not be interpreted restrictively. The appended claims should be taken into consideration for evaluation of the gist of the present invention.

What is claimed is:

1. A channel characteristics estimation system to estimate channel characteristics in a wireless communication system which performs frequency hopping, comprising:
   a transmitter configured to assign phase values of carriers of frequencies used for frequency hopping to a first uniformly different value and transmit a transmission signal for each hopping obtained by converting frequencies; and
   a receiver configured to assign phase values of the carriers of the respective frequencies used for frequency hopping to a second uniformly different value, which is different than said first uniformly different value, so as to maintain a given relation with phase values for said transmitter and perform frequency conversion based on a difference between said first uniformly different value and said second uniformly different value for reception signals of respective frequencies using respective frequencies to obtain a reception signal for each hopping.

2. The channel characteristics estimation system according to claim 1, wherein
   said transmitter is configured to use a transmission start time as a time reference point and align phase values of carriers of respective frequencies used for frequency hopping to 0 at said time reference point.

3. The channel characteristics estimation system according to claim 1, wherein
   said receiver is configured to use a reception start time as a time reference point and align phase values of carriers of respective frequencies used for frequency hopping to 0 at said time reference point.

4. The channel characteristics estimation system according to claim 1, wherein
   said transmitter and/or receiver is configured to divide frequencies output from a single oscillator and generate respective center frequencies by adding and subtracting frequencies to synthesize them.

5. The channel characteristics estimation system according to claim 4, wherein
   said transmitter and/or receiver is configured to use a time reference point corresponding to a specific point in a cycle of the lowest frequency obtained by dividing.

6. The channel characteristics estimation system according to claim 1, wherein
   the receiver is configured to calculate a channel characteristic estimate of a channel between the transmitter and receiver based on the difference between the first and second uniformly different values.

7. The channel characteristics estimation system according to claim 1, wherein
   the transmission signal is obtained by multiplying a baseband signal by a complex sine wave $\text{rot}(f_1 t + \phi_T)$, where $f_1$ is a carrier frequency, t is a start time of a hopping and $\phi_T$ is the first uniformly different phase value, and the reception signal is obtained by multiplying the signal received from the transmitter by a complex sine wave $\text{rot}(f_1 t \phi_R)$, where $f_1$ is a carrier frequency, t is a start time of a hopping and $\phi_T$ is the second uniformly different phase value.

8. A channel characteristics estimation method of estimating channel characteristics in a wireless communication system which performs frequency hopping, said method comprising:
   assigning, at a transmitter, phase values of carriers of frequencies used for frequency hopping to a first uniformly different value and to transmit a transmission signal for each hopping obtained by converting frequencies; and
   assigning, at a receiver, phase values of the carriers of the respective frequencies used for frequency hopping to a second uniformly different value, which is different than said first uniformly different value, so as to maintain a given relation with phase values for said transmitter and to perform frequency conversion based on a difference between said first uniformly different value and said second uniformly different value for reception signals of respective frequencies using respective frequencies to obtain a reception signal for each hopping.

9. The channel characteristics estimation method according to claim 8, further comprising:
   using a transmission start time as a time reference point; and
   aligning phase values of carriers of respective frequencies used for frequency hopping to 0 at said time reference point.

10. The channel characteristics estimation method according to claim 8, further comprising:
    using a reception start time as a time reference point; and
    aligning phase values of carriers of respective frequencies used for frequency hopping to 0 at said time reference point.

11. The channel characteristics estimation method according to claim 8, further comprising:
    dividing, at said transmitter or said receiver, frequencies output from a single oscillator; and
    generating respective center frequencies by adding and subtracting frequencies to synthesize them.

12. The channel characteristics estimation method according to claim 11, further comprising:

using a time reference point corresponding to a specific point in a cycle of the lowest frequency obtained by dividing.

13. A communication apparatus to estimate channel characteristics in a wireless communication system which performs frequency hopping, said apparatus comprising:

reception means for assigning phase values of carriers of frequencies used for frequency hopping to a first uniformly different value and transmitting a transmission signal for each hopping obtained by converting frequencies; and channel characteristics estimation means for assigning phase values of the carriers of the respective frequencies used for frequency hopping to a second uniformly different value, which is different than said first uniformly different value, so as to maintain a given relation with phase values for a transmitter and performing frequency conversion based on a difference between a third uniformly different value assigned by the transmitter and said second uniformly different value for reception signals of respective frequencies using respective frequencies to obtain a reception signal for each hopping.

14. The communication apparatus according to claim 13, wherein said channel characteristics estimation means uses a reception start time as a time reference point and aligns phase values of carriers of respective frequencies used for frequency hopping to 0 at said time reference point.

15. The communication apparatus according to claim 13, wherein said channel characteristics estimation means divides frequencies output from a single oscillator and generates respective center frequencies by adding and subtracting frequencies to synthesize them.

16. The communication apparatus according to claim 15, wherein said channel characteristics estimation means uses a time reference point corresponding to a specific point in a cycle of the lowest frequency obtained by dividing.

17. A communication method of estimating channel characteristics in a wireless communication system which performs frequency hopping, said method comprising:

receiving, from a transmitter, carriers of frequencies used for frequency hopping having phase values assigned to a first uniformly different value for each hopping obtained by converting frequencies; and assigning phase values of the carriers of the respective frequencies used for frequency hopping to a second uniformly different value, which is different than said first uniformly different value, so as to maintain a given relation with phase values assigned by the transmitter and performing frequency conversion based on a difference between said first uniformly different value and said second uniformly different value for reception signals of respective frequencies using respective frequencies to obtain a reception signal for each hopping.

18. The communication method according to claim 17, further comprising:

assigning a reception start time as a time reference point; and aligning phase values of carriers of respective frequencies used for frequency hopping to 0 at said time reference point.

19. The communication method according to claim 17, further comprising:

dividing frequencies output from a single oscillator; and generating respective center frequencies by adding and subtracting frequencies to synthesize them.

20. The communication apparatus according to claim 19, further comprising:

using a time reference point corresponding to a specific point in a cycle of the lowest frequency obtained by dividing.

* * * * *